United States Patent
Moriya et al.

Patent Number: 5,395,896
Date of Patent: Mar. 7, 1995

[54] METAL SCAVENGERS AND PROCESSES FOR THE PRODUCTION THEREOF

[75] Inventors: Masafumi Moriya, Iwakura; Kazuo Hosoda, Tokyo; Masatoshi Yoshida, Tokyo; Ariaki Ohi, Tokyo, all of Japan

[73] Assignee: Miyoshi Yushi Kabushiki Kaisha, Tokyo, Japan

[21] Appl. No.: 104,485

[22] Filed: Jul. 28, 1993

[30] Foreign Application Priority Data

Jul. 28, 1992 [JP] Japan ................. 4-220843

[51] Int. Cl.$^6$ ............. C02F 1/56; C08F 28/02; C08F 8/34
[52] U.S. Cl. ................ 525/328.2; 210/728; 210/735; 252/180; 525/343; 525/354
[58] Field of Search ........ 525/328.2; 252/180; 210/735

[56] References Cited

U.S. PATENT DOCUMENTS

| | | | |
|---|---|---|---|
| 4,670,160 | 6/1987 | Moriya | 210/728 |
| 4,670,180 | 6/1987 | Moriya | 252/180 |
| 4,731,187 | 3/1988 | Moriya | 210/719 |
| 4,864,075 | 9/1989 | Thompson | 558/237 |
| 4,990,656 | 2/1991 | Bresson | 562/27 |
| 5,130,473 | 7/1992 | Jacobs | 562/27 |
| 5,164,095 | 11/1992 | Sparapany | 210/735 |

FOREIGN PATENT DOCUMENTS 52-152657 12/1977 Japan.

*Primary Examiner*—Fred Zitomer
*Attorney, Agent, or Firm*—Sherman and Shalloway

[57] ABSTRACT

The present invention is intended to provide a metal scavenger that is free from the defects of metal scavengers formed by introducing dithioic acid groups to polyalkylenepolyamines or the like, is high in settling speed of flock when used in waste water treatment, and can carry out treatment of waste water efficiently and also to provide a process of producing the same efficiently. The present metal scavenger has a structure that is formed by replacing the hydrogen atoms linked to the nitrogen atoms of a polyamine having aminomethyl groups by dithioic acid groups or their salts and that is represented by the following general formula:

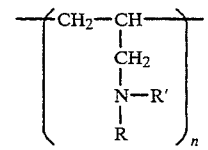

wherein R represents a dithioic acid group, an alkali metal dithioate group, an alkaline earth metal dithioate group, or an ammonium dithioate group and R' represents a hydrogen atom, a dithioic acid group, an alkali metal dithioate group, an alkaline earth metal dithioate group, or an ammonium dithioate group.

The present metal scavenger can be obtained by causing carbon disulfide to act on a polyamine having aminomethyl groups or by polymerizing a monomer having the following formula:

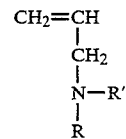

wherein R represents a dithioic acid group, an alkali metal dithioate group, an alkaline earth metal dithioate group, or an ammonium dithioate group and R' represents a hydrogen atom, a dithioic acid group, an alkali metal dithioate group, an alkaline earth metal dithioate group, or an ammonium dithioate group.

6 Claims, No Drawings

METAL SCAVENGERS AND PROCESSES FOR THE PRODUCTION THEREOF

BACKGROUND OF THE INVENTION

1) Field of the Invention

The present invention relates to metal scavengers and processes for the production thereof.

2) Description of the Related Art

There are strict regulations concerning metals in waste water, particularly heavy metals harmful to the human body, such as mercury, cadmium, zinc, lead, copper, and chromium in waste water various techniques of removing metals contained in waste water and the like have been studied and used.

The neutralization coagulation settling technique wherein an alkali neutralizing agent such as slaked lime and sodium hydroxide is added to waste water to convert metals in the waste water into the hydroxides and then the hydroxides are coagulated and settled with a polymer coagulant is widely employed for treating waste water.

However, this technique results in a large amount of sludge of metal hydroxides and it is quite difficult by this technique to remove metals in waste water to or below the extent standardized by this country. Further, there is a problem that since the above sludge of metal hydroxides is dehydrated poorly and is large in volume, the handlability when the sludge is handled (e.g., transported) is poor. Further, there is also a problem that sometimes the way of discarding the sludge causes the metals to redissolve in rivers and the sea, resulting in secondary pollution.

Besides the above neutralization coagulation settling technique, for example, the ion flotation method, the ion exchange method, the electrolysis flotation method, the electrodialysis method, the adsorption method, and the reverse osmosis method are also known for the treatment of heavy metals, actually they are used only for some special cases of treatment of waste water in view, for example, of the removal rates of heavy metals, the operability, and the running cost.

Therefore, recently, in place of these methods, a method of collecting and removing metals with a metal scavenger is being adopted and the present applicant made various suggestions wherein use is made of a metal scavenger having a structure formed by linking at least one dithioic acid group as a functional group to the nitrogen atoms of a polyalkylenepolyamine or a polyethyleneimine or a method of treating water water or the like with that metal scavenger (e.g., Japanese Patent Application Laid-Open Nos. 17128/1985 and 81478/1987).

The metal collecting and removing method previously suggested by the present applicant, in comparison with other methods wherein use is made of other metal scavengers, has an advantage capable of efficient waste water treatment since the settling speed of the flock formed by collecting metals is high and the process from the addition of the metal scavenger to the separation and removal of the flock can be carried out in a short period of time. However, in practical treatment of waste water, since it is required to improve the efficiency of separation of flock and to decrease efficiently and positively metals remaining in the waste water separated from the flock, it is demanded to settle the flock in a short period of time as far as possible, but that demand cannot be satisfied completely when any of the conventional metal scavengers is added alone to the waste water.

Therefore, conventionally, a metal scavenger is added together with a polymer coagulant to waste water or a method is used wherein a metal scavenger is crosslinked with a crosslinking agent such as epichlorohydrin so that the metal scavenger may have a higher molecular weight to increase the settling speed of flock (e.g., Japanese Patent Application Laid-Open No. 249590/1986).

However, there is a problem that when a polymer coagulant is used, the amount of the formed flock increases, leading to troublesome post-treatment of the flock. Further, the process of producing the metal scavenger crosslinked with epichlorohydrin or the like is complicated and the production efficiency and the yield are likely lowered.

Further, in the case of the conventional metal scavenger formed by introducing dithioic acid groups or their salts as functional groups to nitrogen atoms of polyamines such as a polyalkylenepolyamine and a polyethyleneimine, there is also a problem that the number of the functional groups is small in comparison with the number of the nitrogen atoms of the polyamines and therefore a relatively large amount of the metal scavenger must be used to collect and remove positively metals in waste water.

The present invention has been made taking the above points into consideration and an object of the present invention is to provide a metal scavenger having excellent metal collecting performance that, for example, makes the settling speed of flock high and allows easy and positive waste water treatment without increasing the molecular weight by crosslinking with epichlorohydrin or the like or without using a polymer coagulant additionally and to provide a process of producing the same.

The metal scavenger of the present invention has a structure that is formed by replacing the hydrogen atoms linked to the nitrogen atoms of a polyamine having aminomethyl groups by dithioic acid groups or their salts and that is represented by the following general formula (1):

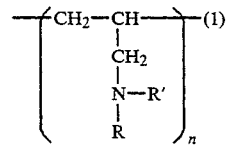

wherein R represents a dithioic acid group, an alkali metal dithioate group, an alkaline earth metal dithioate group, or an ammonium dithioate group and R' represents a hydrogen atom, a dithioic acid group, an alkali metal dithioate group, an alkaline earth metal dithioate group, or an ammonium dithioate group.

The present metal scavenger has as functional groups dithioic acid groups or dithioate groups and, as the dithioate groups, dithioate groups of alkali metals such as lithium, sodium, and potassium, alkaline earth metals such as beryllium, magnesium, and calcium, and ammonia can be mentioned.

Although the molecular weight of the present metal scavenger may widely range from about 300 to 1,000,000, preferably the molecular weight is 1,000 to 500,000.

The backbone of the polyamine is a straight carbon chain consisting only of carbon-carbon linkages as shown in the formula (1). In the formula, "n" is a whole number having a value such that the aforementioned molecular weights are obtained.

The present metal scavenger can be prepared by causing carbon disulfide to act on a polyamine with aminomethyl groups or by causing carbon disulfide to act on allylamine to obtain a monomer (mono- or bis-(dithioic) allylamine or its salt) formed by replacing the hydrogen atom(s) linked to the nitrogen atom of the allylamine by a dithioic acid(s) or its salt and having the following formula (2):

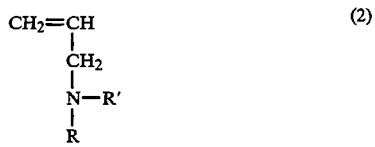

(2)

wherein R represents a dithioic acid group, an alkali metal dithioate group, an alkaline earth metal dithioate group, or an ammonium dithioate group and R' represents a hydrogen atom, a dithioic acid group, an alkali metal dithioate group, an alkaline earth metal dithioate group, or an ammonium dithioate group,
and polymerizing the monomer.

The polyamine with aminomethyl groups used in the first process of producing the present metal scavenger by causing carbon disulfide to act on a polyamine with aminomethyl groups can be produced by the following processes.

The first method of producing a polyamine with aminomethyl groups is a process wherein a polyacrylonitrile, a polyacrylamide, or a polymethacrylamide is reduced. A polyacrylonitrile can be reduced by hydrogenation in the presence of a hydrogenation catalyst, and specifically a process can be mentioned wherein a polyacrylonitrile is dissolved in a solvent such as dimethylformamide or dimethylsulfoxide and is hydrogenated under a high pressure (about 3.5 kg/cm$^2$) by using Raney nickel as a catalyst. For the reduction of a polyacrylamide or a polymethacrylamide, a process can be used wherein a polyacrylamide or a polymethacrylamide is dissolved in a solvent such as tetrahydrofuran, dimethylformamide, and dimethylsulfoxide and is reduced with a metal alcoholate such as sodium methylate or lithium aluminum hydride.

The second method of producing a polyamine with aminomethyl groups is a process of polymerizing allylamine. The process of polymerizing allylamine comprises converting allylamine, for example, to its hydrochloride and polymerizing it by using a redox type initiator or a radical polymerization initiator. In this case, allylamine may be polymerized singly or may be copolymerized with other monomer having a copolymerizable unsaturated bond such as acrylic acid, methacrylic acid, styrenesulfonic acid, their salts, dimethylacrylamide, styrene, methyl methacrylate, methyl acrylate, acrylamide, and methacrylamide. However, in the case of copolymerization, preferably the allylamine is present in an amount of 5 mol % or over, particularly 15 mol % or more.

To introduce a dithioic acid group which will replace the hydrogen atom linked to the nitrogen atom of each aminomethyl group of the polyamine with aminomethyl groups, the polyamine with aminomethyl groups is dissolved in a solvent such as water or an alcohol, carbon disulfide is added thereto, and they are reacted at 10° to 100° C. for about 1 to 20 hours.

In this way, a metal scavenger having a structure wherein one or two hydrogen atoms linked to the nitrogen atom of each aminomethyl group are replaced by dithioic acid groups can be obtained. The reaction ratio of the polyamine with aminomethyl groups to the carbon disulfide varies depending on the number of dithioic acid groups to be introduced into the molecule and in the case wherein the amount of carbon disulfide used is one equivalent weight or less to the nitrogen atoms in the molecule of the polyamine with aminomethyl groups, one or less dithioic acid group on average is introduced to each of the nitrogen atoms of the aminomethyl groups of the polyamine.

On the other hand, in the case wherein the amount of carbon disulfide used is one equivalent weight or more to the nitrogen atoms in the molecule of the polyamine with aminomethyl groups, one or more dithioic acid groups on average are introduced to each of the nitrogen atoms of the aminomethyl groups of the polyamine. Even in the case wherein one or more dithioic acid groups on average are introduced to each of the nitrogen atoms of the aminomethyl groups of the polyamine, preferably the amount of carbon disulfide to be used is 2 equivalent weights or less to the nitrogen atoms in the polyamine molecule.

Dithioic acid groups as substituent groups are introduced to the nitrogen atoms of the aminomethyl groups of a polyamine as mentioned above, and optionally after the reaction, the resulting polyamine is treated with an alkali such as an alkali metal hydroxide, for example, sodium hydroxide or potassium hydroxide, or an alkaline earth metal hydroxide, for example, calcium hydroxide or magnesium hydroxide, or ammonia, so that the dithioic acid groups may be converted, for example, to the alkali metal salts, alkali earth metal salts, or ammonium salts. Alternatively, the above reaction between the polyamine and carbon disulfide may be carried out in the presence of the above alkali to introduce the alkali metal salts, alkali earth metal salts, or ammonium salts of dithioic acid groups.

In the present second process wherein allylamine is interacted with carbon disulfide so that the hydrogen atoms linked to the nitrogen atom of the allylamine may be replaced by dithioic acid groups or their salts and the resulting product is polymerized to obtain a polymer, allylamine and carbon disulfide are reacted in the same way as in the above-described reaction between a polyamine and carbon disulfide, thereby obtaining a monomer (mono- or bis-(dithioic) allylamine) represented by the above formula (2).

In this case, also, after the reaction, the product may be treated with such an alkali as mentioned above, for example, with an alkali metal hydroxide, an alkali earth metal hydroxide, or ammonia, or the reaction with carbon disulfide may be carried out in the presence of such an alkali, so that the dithioic acid group can be converted to its alkali metal salt, alkali earth metal salt, or ammonium salt.

Then, the monomer (mono- or bis-(dithioic) allylamine) formed by replacing the hydrogen atom(s) linked to the nitrogen atom of allylamine by a dithioic acid group(s) or a dithionate group(s) is homopolymerized or copolymerized with other unsaturated monomer such as acrylic acid, methacrylic acid, styrenesulfonic acid, their salts, dimethylacrylamide, styrene, methyl methacrylate, methyl acrylate, acrylamide, or methacrylamide. Preferably, the copolymerization is carried out such that the content of the allylamine monomer having a dithioic acid group(s) as a substituent(s) is 5 mol % or more, more preferably 15% or more.

The above polymerization reaction can be carried out in a solvent such as water, dimethylformamide, and toluene in the presence of a water-soluble polymerization initiator such as 2,2′-azobis(2-amidinopropane) hydrochloride, potassium persulfate, and ammonium persulfate or a radical polymerization initiator such as acryloisobutyronitrile and benzoyl peroxide at 40° to 100° C.

When waste water is treated with the present metal scavenger, the present metal scavenger can be used alone, but when a sodium sulfide such as sodium hydrogensulfide, sodium monosulfide, a sodium polysulfide, for example, sodium disulfide, sodium trisulfide, sodium tetrasulfide, and sodium pentasulfide is used additionally, an excellent metal collecting effect can be obtained.

The present metal scavenger is suitable for treating metals in waste water discharged, for example, from plating plants, incineration plants, laboratories, hospitals, industrial waste disposal processing plants, and electronic part plants as well as suitable for treating metals contained in incineration and flying ash discharged from incineration plants, metals contained in slag discharged from mines and metal refineries, metals contained in sludge discharged from waste water treatment plants, and metals contained in solid waste such as contaminated soil. The present metal scavenger can also be used in scavenging metals contained in exhaust gases discharged from incineration plants.

To treat waste water, for example, after the pH of the waste water is suitably adjusted (generally to 3 to 12), the present metal scavenger is added to the waste water, the formed flock is settled to separate from the waste water and is removed, and the waste water is discharged. To treat solid waste, for example, the present metal scavenger is added into the solid waste to immobilize and insolubilize metals contained in the solid by the metal scavenger, and then the solid waste is solidified with concrete and is discharged into the sea or is used for reclamation.

EXAMPLES

Now, the present invention will be described in detail with reference to the following Examples.

Example 1

200 g of polyacrylonitrile was dissolved in 800 g of dimethylformamide, Raney nickel as a hydrogenation catalyst was added, and the hydrogenation was carried out under conditions having a hydrogen pressure of 3.5 kg/cm$^2$, thereby obtaining a polyamine having aminomethyl groups (yield: 90%; average molecular weight: 20,000). 55 g of this polyamine, 400 g of pure water, and 40 g of sodium hydroxide were charged into a four-necked flask with a reflux condenser, and after 76 g of carbon disulfide was added dropwise thereto over 4 hours with the temperature kept at 40° C. with stirring, the reaction was continued by heating for 10 hours at 80° C. with stirring to obtain an aqueous solution containing a metal scavenger.

Waste water containing 20 ppm of copper(II), 15 ppm of zinc, 10 ppm of nickel, and 2 ppm of mercury was treated with the thus obtained aqueous metal scavenger solution. The aqueous metal scavenger solution was added in such an amount that 50 mg of the metal scavenger was for 1 liter of the waste water, and after the mixture was stirred for 10 min, the mixture was allowed to stand, and the time required for the flock to settle was measured, which is shown in Table 1. The settled flock was separated and removed and the concentrations of metals remaining in the waste water were measured. The results are shown in Table 1.

TABLE 1

|  | Time required for the flock to settle (min) | Concentration of remaining metal ions (ppm) | | | |
| --- | --- | --- | --- | --- | --- |
|  |  | Copper (II) | Zinc | Nickel | Mercury |
| Example 1 | 4 | <0.5 | 2.0 | 1.5 | 0.003 |
| 2 | 3 | <0.5 | 0.5 | 1.0 | 0.002 |
| 3 | 4.2 | <0.5 | 2.5 | 1.6 | 0.003 |
| 4 | 2.9 | <0.5 | 0.5 | 0.9 | 0.001 |
| Comparative 1 | 5 | 1.2 | 3.0 | 2.9 | 0.010 |
| Example 2 | 8 | 1.8 | 5.0 | 3.5 | 0.015 |

Example 2

100 g of polyacrylamide was dispersed into 900 g of tetrahydrofuran and was reduced in the presence of 80 g of sodium methylate to obtain a polyamine having aminomethyl groups (yield: 90%; average molecular weight: 10,000). 55 g of this polyamine, 40 g of pure water, and 60 g of sodium hydroxide were placed in a four-necked flask with a reflux condenser, and after 114 g of carbon disulfide was added dropwise over 4 hours with the temperature kept at 40° C. with stirring, the reaction was continued for 10 hours by heating at 80° C. with stirring to obtain an aqueous solution containing a metal scavenger.

The same waste water as that used in Example 1 was treated with the thus obtained aqueous metal scavenger solution. The results are also shown in Table 1.

Example 3

28.5 g of a polyamine (having an average molecular weight of 30,000) obtained by polymerizing allylamine, 775 g of pure water, and 14 g of sodium hydroxide were placed in a four-necked flask with a reflux condenser, then 26.6 g of carbon disulfide was added dropwise over 6 hours with the temperature kept at 30° C. with stirring, and the reaction was continued for 5 hours by heating at 60° C. with stirring to produce an aqueous solution containing a metal scavenger.

The same waste water as that used in Example 1 was treated with the thus obtained aqueous metal scavenger solution. The results are also shown in Table 1.

Example 4

57 g of allylamine, 80 g of sodium hydroxide, and 400 g of pure water were placed in a four-necked flask with a reflux condenser, then 152 g of carbon disulfide was added dropwise over 4 hours with the temperature kept at 20° C. with stirring, and the reaction was continued for 10 hours by heating at 80° C. with stirring to produce mono (dithioic) allylamine sodium salt. Then 60 g of this monomer was dissolved in 40 g of pure water, 1 g of 1-[(1-cyano-1-methylethyl)azo] formamide was added thereto, and the polymerization was carried out at 100° C. for 20 hours under a flow of nitrogen to produce an aqueous metal scavenger solution.

The same waste water as that used in Example 1 was treated with the thus obtained aqueous metal scavenger solution. The results are also shown in Table 1.

Comparative Example 1

430 g of an aqueous solution containing 10% of a polyethyleneimine (having an average molecular weight of 100,000) and 240 g of 5% sodium hydroxide were placed in a four-necked flask with a reflux condenser, then 22.8 g of carbon disulfide was added dropwise over 2 hours at 32° C. with stirring, and the reaction was continued for 6 hours at 50° C. to produce an aqueous solution containing a metal scavenger formed by introducing sodium dithioate groups as substituents to the nitrogen atoms of the polyethyleneimine.

The same waste water as that used in Example 1 was treated with the thus obtained aqueous metal scavenger solution. The results are also shown in Table 1.

Comparative Example 2

An aqueous solution obtained by dissolving 11 g of sodium hydroxide into 110 g of a 10% aqueous sodium hypochlorite solution was added dropwise to 350 g of an aqueous solution containing 10% of a polyacrylamide (having an average molecular weight of 4,500) with the temperature kept at 50° C. and then the reaction was continued for 30 min at that temperature to produce an aqueous solution containing a polyamine having amino groups. 50 g of 10% sodium hydroxide was added to the thus obtained aqueous solution, then 11.2 g of carbon disulfide was added dropwise thereto over 3 hours at 30° C. with stirring, and the reaction was continued for 5 hours at 70° C. to obtain an aqueous solution of a metal scavenger having sodium dithioate groups as substituents.

The same waste water as that used in Example 1 was treated with the thus obtained aqueous metal scavenger solution. The results are also shown in Table 1.

Effects of the Invention

As described above, when the present metal scavenger is used for treatment of waste water or the like, without using a polymer coagulant additionally, the settling speed of the formed flock is high and the treatment of waste water can be performed efficiently. Further, since the number of functional groups in the metal scavenger can be increased easily, even if the amount of the metal scavenger used is small, metals can be collected and removed efficiently.

Further, according to the present process, a metal scavenger excellent in settling property of flock and collecting property of metals can be obtained even if the molecular weight of that metal scavenger is approximately the same as that of conventional metal scavengers and a metal scavenger having excellent properties can be produced efficiently since, for example, it is not required to increase the molecular weight by carrying out troublesome steps such as crosslinking with epichlorohydrin.

We claim:

1. A polyamine metal scavenger having a structure that is formed by replacing the hydrogen atoms linked to the nitrogen atoms of a polyamine having aminomethyl groups by dithioic acid groups or their salts and that is represented by the following general formula (1):

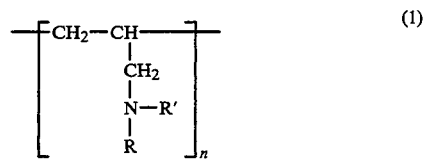

wherein n is a whole number having a value such that the molecular weight of the formula (1) polyamine is 300 to 1,000,000, and wherein R represents a dithioic acid group, an alkali metal dithioate group, an alkaline earth metal dithioate group, or an ammonium dithioate group and R' represents a hydrogen atom, a dithioic acid group, an alkali metal dithioate group, an alkaline earth metal dithioate group, or an ammonium dithioate group.

2. The polyamine metal scavenger of claim 1, wherein the backbone of the polyamine is a straight carbon chain consisting of carbon-carbon linkages.

3. The polyamine metal scavenger of claim 1, wherein the molecular weight of the formula (1) polyamine is 1,000 to 500,000.

4. The polyamine metal scavenger of claim 1, wherein R and R' both represent a dithioic acid group or an alkali metal, alkaline earth metal or ammonium dithioate group.

5. A metal scavenger having a structure that is formed by replacing the hydrogen atoms linked to the nitrogen atoms of a polyamine having aminomethyl groups by dithioic acid groups or their salts and that is represented by the following general formula (1):

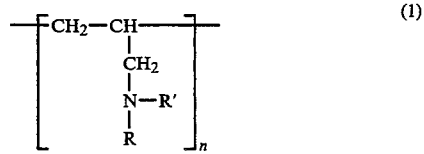

wherein n is a whole number having a value such that the molecular weight of the formula (1) polyamine is 1,000 to 500,000, and the backbone of the polyamine is a straight carbon chain consisting of carbon-carbon linkages, and wherein R represents a dithioic acid group, an alkali metal dithioate group, an alkaline earth metal dithioate group, or an ammonium dithioate group and R' represents a hydrogen atom, a dithioic acid group, an alkali metal dithioate group, an alkaline earth metal dithioate group, or an ammonium dithioate group.

6. The polyamine metal scavenger of claim 5, wherein R and R' both represent a dithioic acid group or an alkali metal, alkaline earth metal or ammonium dithioate.

* * * * *